(12) United States Patent
Childs (10) Patent No.: US 12,117,165 B2
(45) Date of Patent: Oct. 15, 2024

(54) PLASMA HEATING APPARATUS, SYSTEM AND METHOD

(71) Applicant: Aureon Energy Ltd., Oro-Medonte (CA)

(72) Inventor: Montgomery William Childs, Oro-Medonte (CA)

(73) Assignee: Aureon Energy Ltd., Oro-Medonte (CA)

( * ) Notice: Subject to any disclaimer, the term of this patent is extended or adjusted under 35 U.S.C. 154(b) by 736 days.

(21) Appl. No.: 17/399,369

(22) Filed: Aug. 11, 2021

(65) Prior Publication Data

US 2021/0372609 A1    Dec. 2, 2021

Related U.S. Application Data

(62) Division of application No. 15/904,261, filed on Feb. 23, 2018, now Pat. No. 11,112,109.

(51) Int. Cl.

| | |
|---|---|
| *F22B 1/28* | (2006.01) |
| *F24H 1/20* | (2022.01) |
| *F24H 1/22* | (2022.01) |
| *H01S 3/038* | (2006.01) |
| *H05H 1/46* | (2006.01) |
| *H05H 1/48* | (2006.01) |

(52) U.S. Cl.
CPC ............. *F22B 1/281* (2013.01); *F24H 1/203* (2013.01); *F24H 1/225* (2013.01); *H01S 3/0382* (2013.01); *H05H 1/46* (2013.01); *F24H 2250/10* (2013.01); *H05H 1/48* (2013.01)

(58) Field of Classification Search
CPC .. F22B 1/281; F22B 1/284; F22B 1/30; F24H 1/203; F24H 1/225; F24H 2250/10; H01S 3/0382; H05H 1/46; H05H 1/48
USPC ...................................... 219/121.59
See application file for complete search history.

(56) References Cited

U.S. PATENT DOCUMENTS

| | | | | |
|---|---|---|---|---|
| 5,359,966 A | * | 11/1994 | Jensen | F28D 7/022 431/173 |
| 9,088,019 B2 | * | 7/2015 | Benham | H01M 8/04186 |

* cited by examiner

*Primary Examiner* — Dana Ross
*Assistant Examiner* — Joseph W Iskra
(74) *Attorney, Agent, or Firm* — Eugene F. Derenyi; Fogler, Rubinoff LLP (57) ABSTRACT

A plasma heating apparatus including a boiler vessel for holding water to be heated, a cathode housed in the vessel, the cathode defining a watertight cathode chamber isolated from the water in the vessel, and, an anode housed in the cathode chamber, the anode including an internal passage for receiving a gas from outside of the vessel when the passage is connected to a gas supply, and wherein the anode is connectable to a power source for receiving power for generating a plasma in the cathode chamber. In another aspect, the present disclosure relates to a heat or power generating system or plant including the plasma heating apparatus.

9 Claims, 7 Drawing Sheets

PLASMA HEATING APPARATUS, SYSTEM AND METHOD

FIELD OF THE DISCLOSURE

The present disclosure relates generally to a plasma heating apparatus, system and method.

BACKGROUND OF THE DISCLOSURE

In the field of plasma physics, a double layer is a structure in a plasma consisting of two parallel layers of opposite electrical charge. The layers of charge, which are not necessarily planar, produce localised excursions of electric potential, resulting in a relatively strong electric field between the layers and weaker but more extensive compensating fields outside, which restore the global potential. Ions and electrons within the double layer are accelerated, decelerated, or deflected by the electric field, depending on their direction of motion. Double layers can be created in discharge tubes, where sustained energy is provided within the layer for electron acceleration by an external power source.

A boiler for heating hot water using plasma as a heating source is disclosed in U.S. Pat. No. 5,685,997. A disadvantage with such a boiler is that it uses mirrored surfaces which are subject to deterioration by the plasma colliding with the mirrors because the plasma is not sufficiently controlled. Furthermore, the plasma in the boiler does not form double layers.

SUMMARY OF THE DISCLOSURE

In one aspect, the present disclosure relates to a plasma heating apparatus including a boiler vessel for holding water to be heated, a cathode housed in the vessel, the cathode defining a watertight cathode chamber isolated from the water in the vessel, and, an anode housed in the cathode chamber, the anode including an internal passage for receiving a gas from outside of the vessel when the passage is connected to a gas supply, and wherein the anode is connectable to a power source for receiving power for generating a plasma in the cathode chamber. In another aspect, the present disclosure relates to a heat or power generating system or plant including the plasma heating apparatus.

In another aspect, the present disclosure relates to a plasma heating apparatus including a boiler vessel for holding water to be heated, a cathode housed in the vessel, the cathode defining a watertight cathode chamber isolated from the water in the vessel, an anode housed in the cathode chamber, the anode including a solid bulbous cathode head, and wherein the anode is connectable to a power source for receiving power for generating a plasma in the cathode chamber, and, an inlet in the cathode chamber for receiving a gas into the cathode chamber when the inlet is connected to a gas supply. In another aspect, the present disclosure relates to a heat and/or power generating system including the plasma heating apparatus.

In another aspect, the present disclosure relates to a method for generating a plasma for use as an energy source, including providing a cathode chamber, providing a hollow bulbous anode in the chamber, creating a vacuum in the chamber, supplying a gas to the inside of the anode and permitting the gas to pass through the wall of the anode and into the chamber, applying a current and a voltage to the anode according to Paschen's Law for generating a plasma discharge in the chamber with gas that has passed through the wall of the anode, and, altering the plasma discharge to form one or more double layer shells around the anode by varying one or more of the applied current, the applied voltage and the pressure in the chamber. In another aspect, the present disclosure relates to a heat or power generating system including the method for generating a plasma for use as an energy source.

BRIEF DESCRIPTIONS OF DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
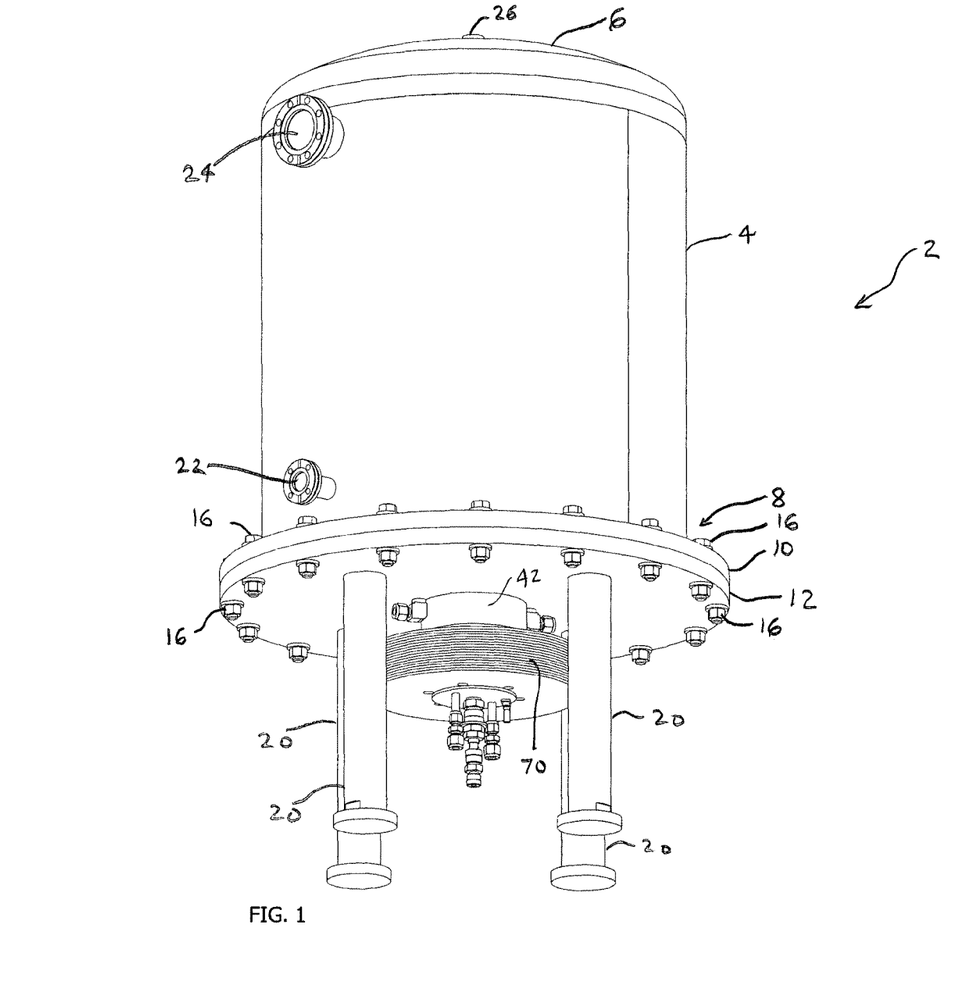
FIG. 1 is a perspective view from the bottom of a plasma heating apparatus according to an aspect of the present disclosure.

Referring initially to FIG. 1, in one embodiment, the present invention is directed to a plasma heating apparatus including a boiler vessel indicated generally at 2 which includes a cylindrical wall 4 and a closed top 6, and an open bottom indicated generally at 8. A flange 10 is provided at the open bottom 8. A disk-shaped base plate 12 closes the open bottom 8. The plate 12 is provide with a round central opening 14. The flange 10 is fastened to the base plate 12 with bolts 16. An o-ring 18 provides a watertight seal. Four legs 20 support the vessel 2 in a raised position. A water outlet 22 and a steam outlet 24 are provided in the cylindrical wall 4. A pressure control relief valve 26 is provided in the head 6. The vessel 2 is constructed of metal, metal composite or other suitable material capable of withstanding elevated heat and pressure and maintaining water tightness.

The vessel 2 encloses a cathode chamber indicated generally at 28 including a bulbous hollow cathode head 30 on a cylindrical hollow cathode stem 32. A flange 34 is provided at one end of the stem 32. The cathode chamber 28 is positioned on the base plate 12 with the flange 32 surrounding the central opening 14. The cathode chamber 28 is fastened to the base plate 12 with bolts 34.

In one embodiment, the cathode chamber 28 is constructed of metal, such as for example, iron, steel or a metal-based alloy. In other embodiments, the cathode chamber can take another shape provided that the cathode encloses the anode and permits the formation of plasmas according to embodiments of the present invention.

Figure 3:
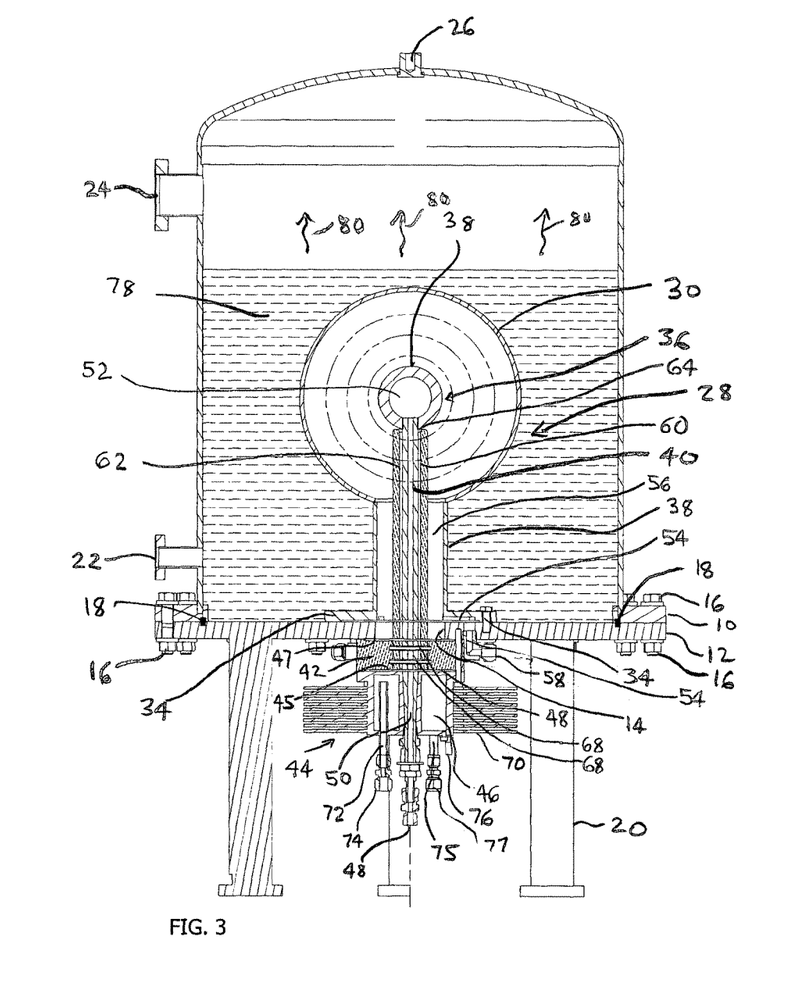
FIG. 3 is a section view taken along A-A of FIG. 2.

The cathode chamber 28 encloses an anode indicated generally at 36 which includes a bulbous hollow anode head 38 on a cylindrical anode stem 40. In one embodiment, the anode head 38 and the anode stem 40 are made of metal such as for example steel or an iron-based alloy. The anode head 38 is positioned in the cathode head 30 and the anode stem 40 extends from the anode head 30 down through the cathode stem 32 and through the central opening 14. The anode stem 38 extends below the base plate 12, through an insulating ring 42 and a heat exchanger indicated generally at 44. The anode stem 40 tapers as it passes through an annular cooling chamber 46 of the heat exchanger 44 and terminates at a hose fitting 48 for connection to a gas line (not shown) of a gas supply source (not shown). A central channel 50 in the anode stem 40 extends from the hose fitting 48 to the interior space 52 of the anode head 38.

A passage 54 in the flange 34 and in communication with the interior volume 56 of the cathode chamber 28 extends from the cathode stem 38 through the base plate 12 to a hose fitting 58. The interior volume 56 is a contiguous volume which includes the interior volume of the cathode head 30 and the interior volume of the cathode stem 38. The passage 54 can be used as conduit for introducing a gas into the interior volume 56 cathode chamber 28 and for evacuating gas from the cathode chamber 28. A vacuum pump (not shown) can be connected to the hose fitting 58.

The anode stem 40 is shrouded by a dialectic sleeve 60 which forms an annular channel 62 between the dialectic sleeve 60 and the anode stem 40. The dialectic sleeve 60 is made of quartz or other suitable dialectic material. The dialectic sleeve 60 minimizes plasma discharges from the anode stem 40. The annular channel 62 is open at a top end 64 to the interior volume 56 of the cathode chamber and extends through the central opening 14 and the insulating ring 42, terminating at the bottom 45 of the insulating ring 42. An upper gasket 47 provides a hermetic seal between the insulating ring 42 and the base plate 12, while a lower gasket 48 provides a hermetic seal between the insulating ring 42 and the annular cooling chamber 46 and the bottom 66 of the dialectic sleeve 60. Two o-rings 68 around the dialectic sleeve 60 hermetically seal the dialectic sleeve 60 in the insulating ring 42.

The heat exchanger 44 also includes dissipating fins 70. A dialectic fluid inlet pipe 72 extends into the annular cooling chamber 46 and is provided with a hose fitting 74. A dialectic fluid outlet pipe 75 extends from the annular cooling chamber 46 and is provided with a hose fitting 77. Dialectic fluid circulated through the chamber 46 helps cool the anode.

A power source connector 76 is provided on the heat exchanger 44 for connection to a power source (not shown) which can for example be a DC power source, an AC power source, a modulated DC power source of varying frequencies or other power source suitable for generating a plasma.

In operation, in one embodiment, when a hollow anode according to an embodiment is used, a plasma discharge from the anode is started by introducing a gas under positive pressure via the central channel into the anode head and applying a breakdown voltage to the anode.

Paschen's law is an equation that gives the breakdown voltage, that is, the voltage necessary to start a discharge or electric arc, between two electrodes in a gas as a function of pressure and gap length. Paschen's Law describes the point of current flow through an ionizable gas between two electrodes at a specific voltage. the breakdown voltage is a function of pressure. Paschen's Law is given by the equation:

$$V_B = \frac{Bpd}{\ln(Apd) - \ln\left[\ln\left(1 + \frac{1}{\gamma_{se}}\right)\right]},$$

where V is the breakdown voltage in volts, p is the pressure in pascals, d is the gap distance in meters, $\gamma_{se}$ is the secondary-electron-emission coefficient (the number of secondary electrons produced per incident positive ion), A is the saturation ionization in the gas at a particular E/p (electric field/pressure), and B is related to the excitation and ionization energies. The constants A and B are determined experimentally and found to be roughly constant over a restricted range of E/p for any given gas.

Figure 6:
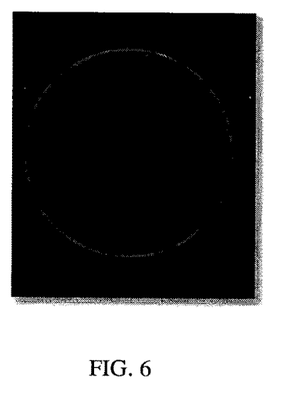
FIG. 6 is an image of a dark quiescent plasma regime around an anode according to an embodiment of the invention.
Figure 7:
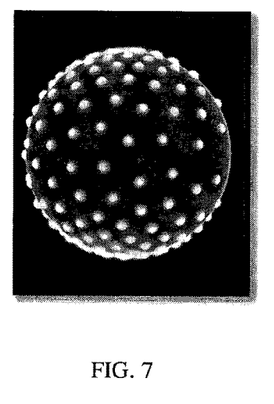
FIG. 7 is an image of a plasma regime with anode tufting around an anode according to an embodiment of the invention.
Figure 8:
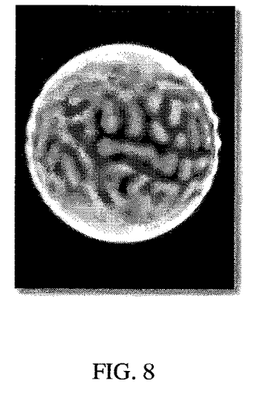
FIG. 8 is an image of a plasma regime with anode tufting around an anode according to an embodiment of the invention.
Figure 9:
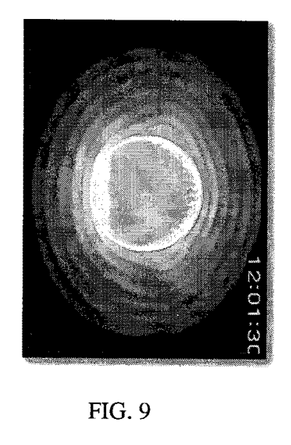
FIG. 9 is an image of a plasma regime with symmetric concentric double layer shells around an anode according to an embodiment of the invention.
Figure 10:
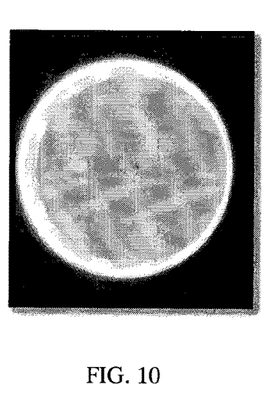
FIG. 10 is an image of a quiescent plasma regime.
Figure 11:
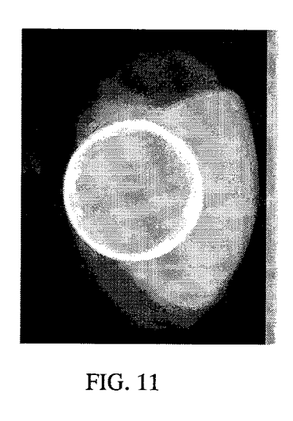
FIG. 11 is an image of asymmetric concentric double layer shells around an anode according to an embodiment of the invention.

In according to one embodiment, hydrogen gas introduced into the anode head and passes through the wall of the anode head and into the cathode chamber and with current and voltage applied according to Paschen's Law, a plasma is ignited in the cathode chamber. In certain embodiments, once a plasma discharge has been started, the plasma discharge is altered to include one or more stable double layers. In one embodiment, the plasma discharge is altered by increasing the applied current, voltage and/or pressure. Referring to FIG. 6, in one embodiment, the plasma formed is a dark quiescent plasma which includes at least one double layer. Referring to FIG. 7 and FIG. 8, in another embodiment, the plasma formed includes anode tufting and at least one double layer. Referring to FIG. 9, in another embodiment, the plasma formed includes symmetric concentric spherical double layer shells. Referring to FIG. 10, in another embodiment, the plasma formed is a quiescent plasma which includes at least one double layer. Referring to FIG. 11, in another embodiment, the plasma formed includes asymmetric concentric spherical double layer shells are asymmetric.

Figure 12:
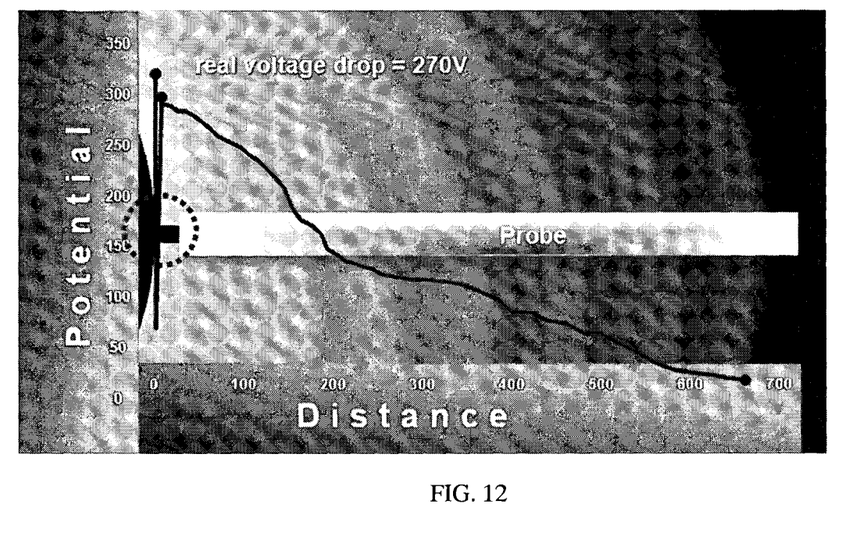
FIG. 12 is a diagram showing voltage drops in double layers according to an embodiment of the invention.

Referring to FIG. 12, the present inventor has measured voltage drops between double layers. Moving away from the anode head (shown on the left), in the plasma there is an initial voltage drop for the first double layer which is just off the surface of the anode head (in one embodiment, about 0.03 mm away from the anode), followed by an increase in voltage and then voltage drops between subsequent double layers.

In one embodiment, a concentric spherical double layer is formed when in addition to the introduced gas, a catalyst is present in at least trace amounts. The catalyst is a negatively ionizing element or molecule. In one embodiment, the catalyst is drawn from the anode. In another embodiment, the catalyst is drawn from the cathode. In one embodiment, the catalyst drawn from the anode or cathode is copper. In another embodiment, the catalyst drawn from the anode or cathode is tungsten. In another embodiment, the catalyst is present or provided in the interior volume of the cathode chamber. In one embodiment, the catalyst in the cathode chamber is a gas. In another embodiment, the catalyst in the cathode chamber is an elemental gas or a molecular gas. In certain embodiments, the catalyst is a gas selected from the group consisting of one or more of nitrogen, acetone, methanol, benzene, oxygen, and carbon dioxide.

Without wishing to be bound by theory, ions emanating from the anode head and electrons emanating from the cathode tend to become trapped in double layers thus minimizing the number of ions reaching the cathode and the number of electrons reaching the anode. In this way, deterioration of the cathode from ion bombardment is minimized. The double layers emit a continuous spectrum of light from high frequency wavelength from at least the VUV light to low frequency wavelength infrared light and black body radiation spectrums.

The cathode chamber walls are thermally responsive to spectral emission from the plasma and increase in temperature as a result. The cathode chamber walls are in contact with water 78 in the boiler vessel and due to the thermal conductivity of the cathode chamber walls, thermal energy is transferred to the water 78 thus heating the water 78 and forming steam 80 once sufficient thermal energy is transferred to the water 78.

Figure 2:
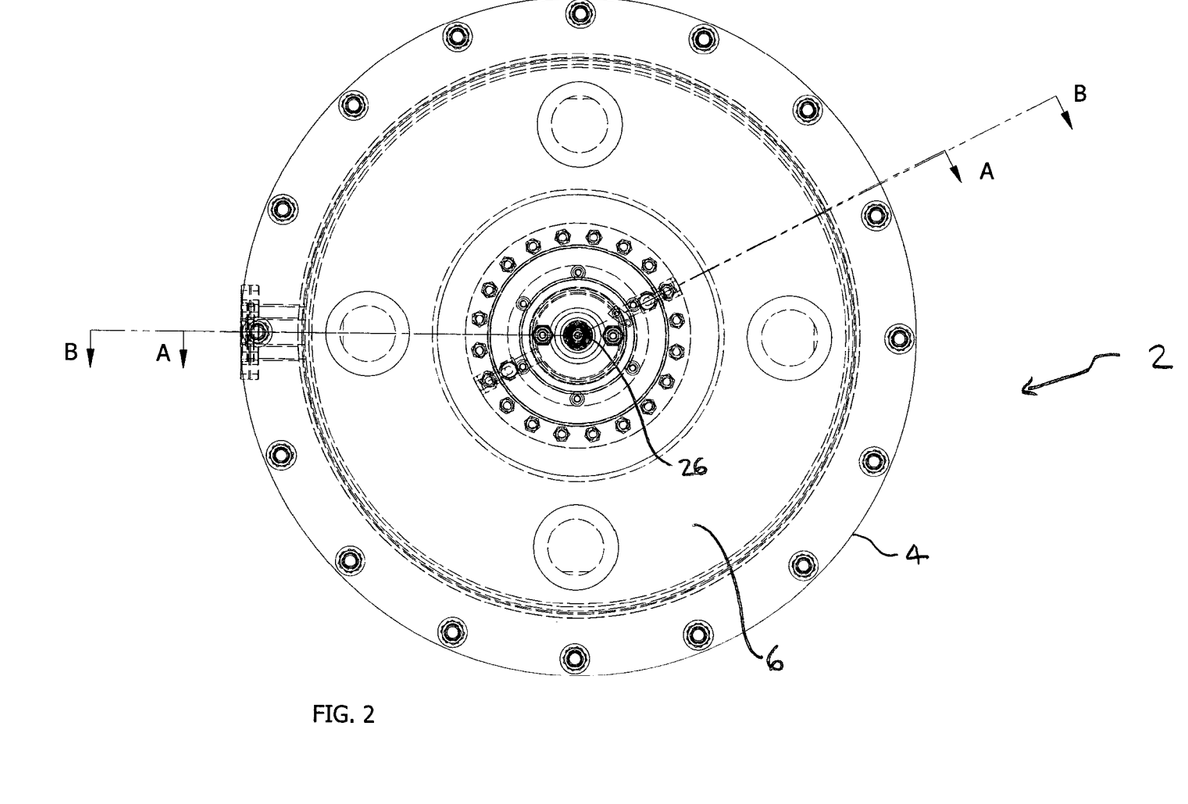
FIG. 2 is a bottom view of the apparatus of FIG. 1.
Figure 4:
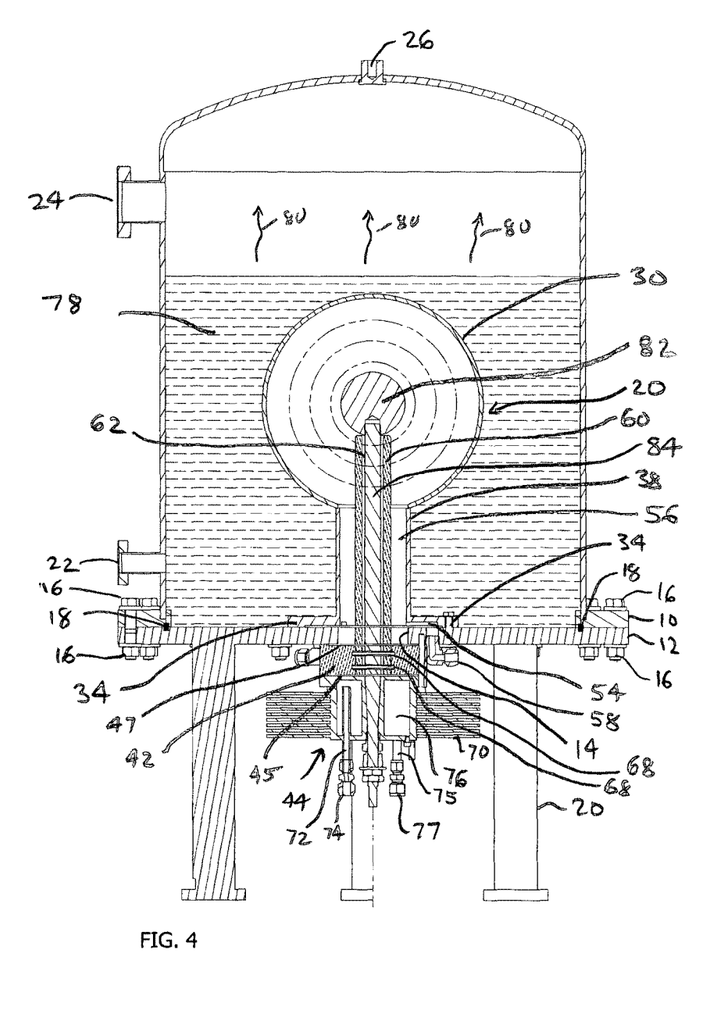
FIG. 4 is a section view taken along B-B of FIG. 2 depicting a plasma heating apparatus according to another aspect of the present disclosure 1.

Referring to FIG. 4, in another embodiment, the plasma heating apparatus of FIGS. 1 to 3, is modified to include a solid anode 82 rather than a hollow anode. The solid anode 82 head sits on a solid anode stem 84 which does not have a central channel. The components of the plasma apparatus according to this embodiment are otherwise the same as for the embodiment of the plasma apparatus with a hollow anode.

In operation, in the boiler vessel of FIG. 4, a gas which functions as a fuel for the plasma generated is introduced into the interior volume 56 of the cathode chamber via hose fitting 58 and passage 54. In another embodiment, the gas is a high molecular weight gas. In certain embodiments, the gas is one or more of acetone, methanol, benzene, oxygen, and carbon dioxide. In one embodiment, a catalyst is introduced in at least trace amounts into the interior volume 56 in addition to the gas. In one embodiment, the catalyst is a gas. In one embodiment, the catalyst gas is nitrogen.

Figure 5:
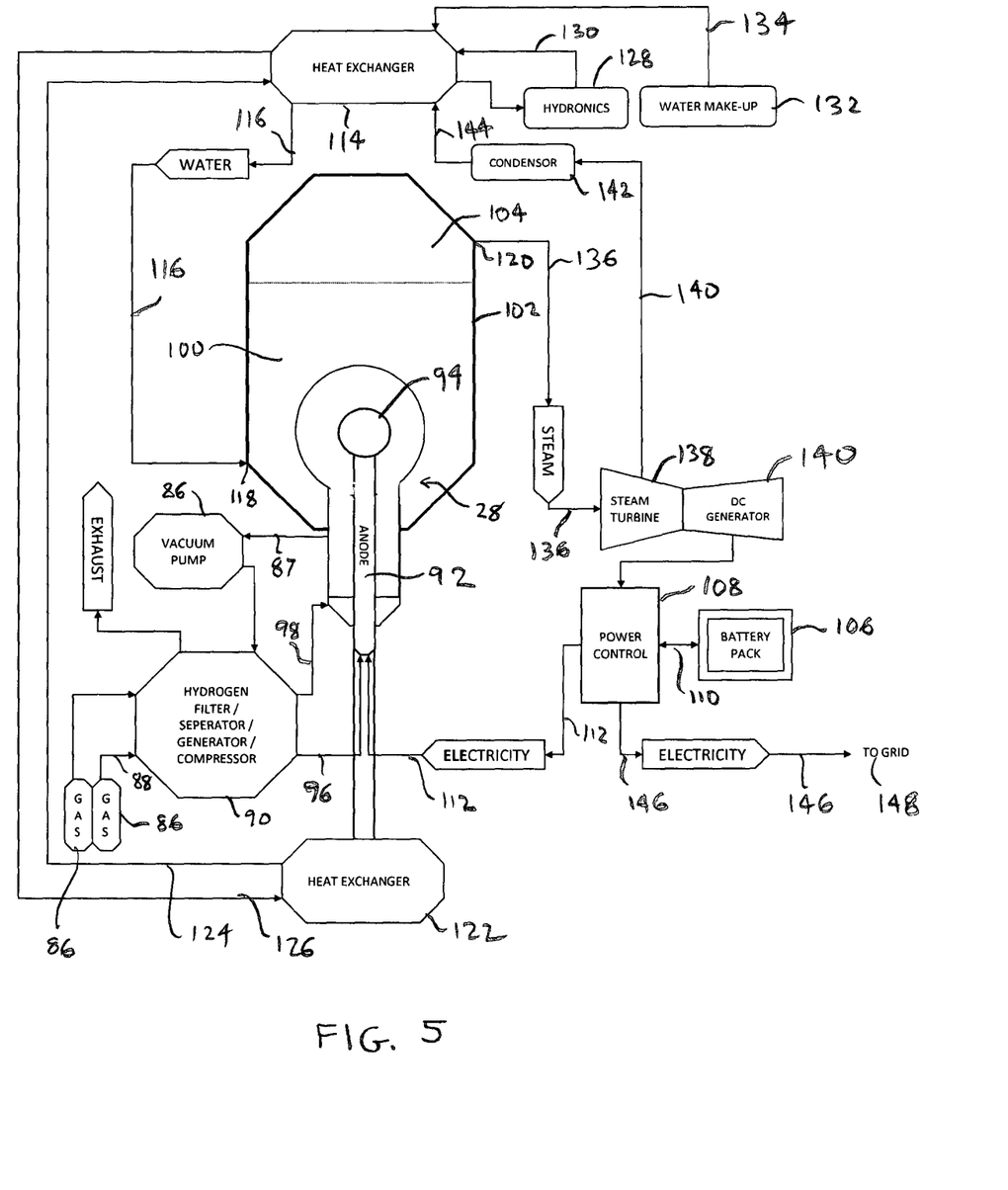
FIG. 5 is a schematic diagram of a heating system according to an embodiment of the invention.

Referring to FIG. 5, in one embodiment, a plasma heating apparatus according to the embodiments of the present invention can form part of a steam heating/power generating system or plant. A vacuum pump 86 is used to form a vacuum in the cathode chamber 28. The cathode chamber is evacuated to the vacuum pump 86 via line 87. In one embodiment, the vacuum generated in the cathode chamber 28 is a moderate vacuum. In certain other embodiments, the vacuum generated is between about 10 mTorr and 500 Torr. When an anode stem 92 with a hollow head 94 is used, hydrogen gas to fuel the plasma is supplied under positive pressure from gas tanks 86 via gas line 88 to hydrogen filter/separator/generator/compressor 90 and then via gas line 96 to the central channel (not shown) of the anode stem 92 and then the anode head 94. When the anode stem 92 and the anode head 94 are solid, hydrogen has introduced from the hydrogen filter/separator/generator/compressor 90 and then via gas line 98. In certain embodiments, the gas is introduced under a pressure ranging from about 20 psi to about 1500 psi. The amount of pressure used can vary depending upon the density and the thickness of the wall of the anode head 94. The type of power and power frequency and amount of Amps and Volts applied will vary depending upon, for example, the size of the anode and the reactor and the required number of energy states of the plasma double layers.

The energy released by the plasma transfers through the walls of the cathode chamber 28 and is absorbed by water 100 in the boiler vessel 102. Steam 104 can be generated from the water 102 if sufficient energy is absorbed by the water 102. The steam can then be used in an energy system to power a stream turbine, for example.

In the embodiment of FIG. 5, DC power is supplied to the anode stem 92 and the anode head 94 from a battery pack 106. The battery pack 106 is connected to a power control 108 via electrical line 110. Electric power flows to the anode stem 92 from the power control 108 via electrical line 112. Water 104 is supplied from heat exchanger 114 via water line 116 and enters the boiler vessel 102 at an inlet 118 and generated steam 104 exits the boiler vessel 102 at an outlet 120. Heat exchanger 122 is connected to the anode stem 92 for removing heat from the anode stem 92. The heat exchanger 122 is connected to the heat exchanger 114 via lines 124 and 126. Heated fluid (not shown) from the heat exchanger 122 is circulated via line 124 to the heat exchanger 114 and is used to preheat water in the heat exchanger 114 entering the boiler vessel 102 via water line 116. The heat exchanger 114 is also connected to a hydronics system 128 via line 130. A water make-up 132 provides water input to the heat exchanger 114 via water line 134. Steam 104 is fed via steam line 136 to drive a steam turbine 138 which drives a DC generator 140. Electricity from the generator 140 is fed to the power control 108 and can be used as the power source once the system is generating power rather than using power from the battery pack 106. The battery pack 106 can also be recharged using power from the power control 108. After passing through the steam turbine 138, steam moves via conduit 140 to a condenser 142. Condensed water from the condenser 142 is fed via water line 144 the heat exchanger 114. DC power not needed for the operation of the system is converted to AC power using an inverter (not shown) in the power control 108 and can be fed via electrical line 146 into an electrical grid 148.

Accordingly, the present disclosure should only be limited by the scope of the claims that follow.

The invention claimed is:

1. A plasma heating apparatus comprising: a boiler vessel for holding water to be heated,
a cathode housed in the vessel, the cathode defining a watertight cathode chamber isolated from the water in the vessel,
an anode housed in the cathode chamber, the anode comprising a
solid bulbous cathode head, and
wherein the anode is connectable to a power source for receiving power for generating a plasma in the cathode chamber,
and,
an inlet in the cathode chamber for receiving a gas into the cathode chamber when the inlet is connected to a gas supply.

2. The plasma heating apparatus of claim 1, wherein the plasma comprises one or more double layers.

3. The plasma heating apparatus of claim 2, wherein the double layers are concentric double layer shells.

4. The plasma heating apparatus of claim 3, wherein the shells are symmetric.

5. The plasma heating apparatus of claim 3, wherein the shells are asymmetric.

6. The plasma heating apparatus of claim 1, further comprising a catalyst present or provided in the cathode chamber where the catalyst is a negatively ionizing element or molecule.

7. A method for generating a plasma for use as an energy source, comprising:
providing a cathode chamber,
providing a hollow bulbous anode in the chamber, creating a vacuum in the chamber, supplying a gas to the inside of the anode and permitting the gas to pass through the wall of the anode and into the chamber, applying a current and a voltage to the anode according to Paschen's Law for generating a plasma discharge in the chamber with gas that has passed through the wall of the anode, and, altering the plasma discharge to form one or more double layer shells around the anode by varying one or more of the applied current, the applied voltage and the pressure in the chamber.

8. The method of claim 7, further comprising providing a catalyst, where the catalyst is a negatively ionizing element or molecule.

9. The plasma heating apparatus of claim 8, wherein the catalyst is drawn from the anode or is present or provided in the chamber.

\* \* \* \* \*